United States Patent
Gu et al.

(10) Patent No.: US 10,252,943 B2
(45) Date of Patent: Apr. 9, 2019

(54) CEMENT MORTAR ADDITIVE FOR EXTRUSION MOLDING, CEMENT MORTAR FOR EXTRUSION MOLDING, AND EXTRUSION-MOLDED PRODUCT

(71) Applicant: LOTTE FINE CHEMICAL CO., LTD., Ulsan (KR)

(72) Inventors: Bon Hyeok Gu, Ulsan (KR); Tae Hong Kim, Ulsan (KR); Won Hee Lee, Seoul (KR); Min Seok Kang, Ulsan (KR); Myung Jae Lee, Ulsan (KR); Myeong Ho Jeon, Gyeongsan-si (KR); Gyu Chul Lee, Ulsan (KR)

(73) Assignee: LOTTE FINE CHEMICAL CO., LTD., Ulsan (KR)

( * ) Notice: Subject to any disclaimer, the term of this patent is extended or adjusted under 35 U.S.C. 154(b) by 0 days.

(21) Appl. No.: 15/329,076

(22) PCT Filed: May 8, 2015

(86) PCT No.: PCT/KR2015/004632
§ 371 (c)(1),
(2) Date: Jan. 25, 2017

(87) PCT Pub. No.: WO2016/032090
PCT Pub. Date: Mar. 3, 2016

(65) Prior Publication Data
US 2017/0210669 A1   Jul. 27, 2017

(30) Foreign Application Priority Data

Aug. 29, 2014 (KR) .................. 10-2014-0114528

(51) Int. Cl.
C04B 24/38 (2006.01)
C04B 28/04 (2006.01)
C04B 111/00 (2006.01)

(52) U.S. Cl.
CPC .......... *C04B 24/386* (2013.01); *C04B 24/383* (2013.01); *C04B 28/04* (2013.01); *C04B 2111/00129* (2013.01)

(58) Field of Classification Search
CPC ..... C04B 24/383; C04B 24/386; C04B 28/04; C04B 2111/00129
See application file for complete search history.

(56) References Cited

U.S. PATENT DOCUMENTS

| | | | | |
|---|---|---|---|---|
| 5,182,380 A | * | 1/1993 | Breckwoldt | C04B 24/168 536/101 |
| 2005/0034636 A1 | * | 2/2005 | Schlesiger | C04B 24/383 106/805 |

FOREIGN PATENT DOCUMENTS

| KR | 100449387 | 9/2004 |
|---|---|---|
| KR | 1020050016222 | 2/2005 |
| KR | 1020070107769 | 11/2007 |
| KR | 1020100118802 | 11/2010 |
| KR | 1020140073291 | 6/2014 |

OTHER PUBLICATIONS

Chang et al "Cellulose-based hydrogels: Present status and application prospects", Carbohydrate Polymers 84 (2011) pp. 40-53.*
Kato et al "Microporous, fast response cellulose ether hydrogel prepared by freeze-drying", Colloids Surf B Biointerfaces, Nov. 2004, 38(3-4). abstract only.*
Nakagawa et al "Thermoresponsive Hydrogel of Diblock Methylcellulose: Formation of Ribbonlike Supramolecular Nanostructures by Self-Assembly", Langmuir 2012, 28, pp. 12609-12618.*
Sanninoi et al "Biodegradable Cellulose-based Hydrogels: Design and Applications", Materials Feb. 2009, pp. 353-373.*
Derwent-Acc-No. 2016-453432, abstract of Korean Patent Specification No. KR 2016081695 A (Jul. 2016).*
International Search Report—PCT/KR2015/004632 dated Jul. 20, 2015.
Written Opinion—PCT/KR2015/004632 dated Jul. 20, 2015.

\* cited by examiner

*Primary Examiner* — Anthony J Green
(74) *Attorney, Agent, or Firm* — Cantor Colburn LLP

(57) ABSTRACT

Provided are a cement mortar additive for extrusion molding, a cement mortar for extrusion molding, and an extrusion-molded product. The disclosed cement mortar additive for extrusion molding includes hydrogelated cellulose ether.

5 Claims, No Drawings

CEMENT MORTAR ADDITIVE FOR EXTRUSION MOLDING, CEMENT MORTAR FOR EXTRUSION MOLDING, AND EXTRUSION-MOLDED PRODUCT

TECHNICAL FIELD

The present invention relates to a cement mortar additive for extrusion molding, a cement mortar for extrusion molding, and an extrusion-molded product, and more particularly, to a cement mortar additive for extrusion molding including hydrogelated cellulose ether, a cement mortar for extrusion molding including the additive, and an extrusion-molded product of the cement mortar for extrusion molding.

BACKGROUND ART

A cement mortar for extrusion molding includes a cement, a fine aggregate, a fiber, and an additive. In general, the cement mortar for extrusion molding has been used in the fields of civil engineering and construction such as exterior wall materials, roofing materials, flooring materials, and soundproof wall materials for construction.

Asbestos, which has been conventionally used as the fiber, decreases discharge pressure of a cement mortar during extrusion molding, increases surface smoothness of extrusion-molded products, and decreases green body hardness of the extrusion-molded products, and thus cement extrusion-molded products have been manufactured with high molding efficiency. However, since asbestos has been designated as a carcinogenic material, the use of asbestos in the cement mortar for extrusion molding has been strictly restricted by the law. Thus, various fibers such as inorganic fiber such as glass fiber, pulp such as carbon fiber, wastepaper, polyamide fiber, polypropylene fiber, and polyester fiber have replaced asbestos in cement mortar for extrusion molding. Although pulp or wastepaper has been mainly used to replace asbestos, the use of pulp or wastepaper having lower strength and dispersibility than asbestos may cause problems such as decrease in discharge pressure of cement mortar during extrusion molding, hardness of extrusion-molded products, surface smoothness of the extrusion-molded products, and/or molding efficiency of the extrusion-molded products.

In order to overcome these problems, cellulose derivatives such as cellulose ether have been widely used as cement mortar additives for extrusion molding. This is because the cellulose derivatives increase plasticity, water retentivity, and lubricity of the cement mortar for extrusion molding, thereby providing higher molding efficiency of the extrusion-molded products.

Hydroxypropylmethylcellulose (HPMC) and hydroxyethylmethylcellulose (NEMC) have been used as the cellulose derivatives. Intrinsic physical properties of the cellulose derivatives may vary according to types of substituent, degree of substitution, and pattern of substitution, and physical properties of extrusion molded panels may also be influenced thereby.

Water retentivity and lubricity of extrusion-molded products may be improved to a predetermined level by using currently available cellulose derivatives. However, to further improve quality of extrusion-molded products and productivity thereof, there is a need to improve workability of cement mortar for extrusion molding and increase productivity of extrusion-molded products by increasing water retentivity and lubricity of the extrusion-molded products and reducing discharge pressure of the cement mortar for extrusion molding and to enhance dimensional stability of the extrusion-molded products such as a cement panel. However, these properties cannot be obtained simply by increasing the amount of the cement mortar additive for extrusion molding, and there is a need to find a fundamental solution.

DETAILED DESCRIPTION OF THE INVENTION

Technical Problem

The present invention provides a cement mortar additive for extrusion molding including hydrogelated cellulose ether.

The present invention also provides a cement mortar for extrusion molding including the additive.

The present invention also provides an extrusion-molded product of the cement mortar for extrusion molding.

Technical Solution

According to an aspect of the inventive concept, there is provided a cement mortar additive for extrusion molding including hydrogelated cellulose ether.

The hydrogelated cellulose ether may be formed via chemical reaction between water-soluble cellulose ether or raw materials of the water-soluble cellulose ether and at least one of an association agent and a crosslinking agent.

The hydrogelated cellulose ether is formed by substituting hydrogen atoms of hydroxyl groups included in the water-soluble cellulose ether or raw materials of the water-soluble cellulose ether with at least one type of substituent included in the association agent and the crosslinking agent.

The hydrogelated cellulose ether may be formed via associative bonding of the water-soluble cellulose ether or raw materials of the water-soluble cellulose ether by the association agent.

The hydrogelated cellulose ether may be formed via crosslinking of the water-soluble cellulose ether or raw materials of the water-soluble cellulose ether by the crosslinking agent.

The water-soluble cellulose ether may be selected from methylcellulose, hydroxypropylmethylcellulose, hydroxyethylmethylcellulose, carboxymethylcellulose, and a mixture of at least two thereof.

The association agent may be a C10-C24 compound including a halogen group, an epoxy group, or an unsaturated group.

The association agent may be a C10-C24 alkyl glycidyl ether, a C10-C24 alkyl halide, a halo hydride, or a mixture thereof.

The crosslinking agent may include at least two functional groups selected from a halogen group, an epoxy group, and an unsaturated group.

The crosslinking agent may be selected from 1,2-dichloroethane, 1,3-dichloropropane, 1,4-dichlorobutane, 2,2'-dichlorodiethylether, 1,4-butanediol diglycidyl ether, ethylene glycol diglycidyl ether, 1,6-hexanediol diglycidyl ether, propylene glycol diglycidyl ether, polyethylene glycol diglycidyl ether, polypropylene glycol diglycidyl ether, polytetramethylene glycol diglycidyl ether, neopentyl glycol diglycidyl ether, polyglycerol polyglycidyl ether, diglycerol polyglycidyl ether, glycerol polyglycidyl ether, trimethylpropane polyglycidyl ether, 1,2-(bis(2,3-epoxypropoxy)ethylene, pentaerythritol polyglycidyl ether, sorbitol polyglycidyl ether, divinyl sulfone, glycidyl methacrylate, epichlorohydrin, epibromohydrin, or a mixture of at least two thereof.

A viscosity of a 1 wt % aqueous suspension of the hydrogelated cellulose ether measured using a Brookfield viscometer at 20° C. at 20 rpm may be from 100 to 100,000 cps.

According to another aspect of the inventive concept, provided is a cement mortar for extrusion molding including a cement and the cement mortar additive for extrusion molding.

An amount of the hydrogelated cellulose ether may be from 0.1 to 5.0 parts by weight based on 100 parts by weight of the cement mortar for extrusion molding.

According to another aspect of the inventive concept, provided is an extrusion-molded product of the cement mortar for extrusion molding.

The extrusion-molded product may be a cement panel.

Advantageous Effects of the Invention

A cement mortar additive for extrusion molding including a hydrogelated cellulose ether according to an embodiment may improve and control thickening power, and binding force, absorbency, and water retentivity of a cement mortar for extrusion molding compared with conventional products, thereby providing a cement mortar for extrusion molding having high cohesiveness between components and reduced foams therein. Also, a cement mortar for extrusion molding including the cement mortar additive for extrusion molding has increased lubricity and decreased discharge pressure, thereby enhancing workability, spring back property, and dimensional stability.

MODE OF THE INVENTION

Hereinafter, a cement mortar additive for extrusion molding according to an embodiment of the present invention will be described in detail.

The cement mortar additive for extrusion molding according to an embodiment includes hydrogelated cellulose ether.

Throughout the specification, the term "hydrogelated cellulose ether" refers to cellulose ether forming a colloidal gel when dispersed in water.

The hydrogelated cellulose ether provides excellent water retentivity and lubricity to a cement mortar for extrusion molding including the same, thereby reducing a discharge pressure of the cement mortar for extrusion molding and increasing an extruding rate during extrusion molding, resulting in improving workability of the cement mortar for extrusion molding and productivity and dimensional stability of an extrusion-molded product.

The hydrogelated cellulose ether may be prepared via chemical reaction between a water-soluble cellulose ether or raw materials of the water-soluble cellulose ether and at least one of an association agent and a crosslinking agent.

Hereinafter, a method of preparing the hydrogelated cellulose ether will be described in detail.

For example, the hydrogelated cellulose ether may be prepared by preparing the water-soluble cellulose ether from the raw materials of the water-soluble cellulose ether, and then performing chemical reaction between the prepared water-soluble cellulose ether with at least one of the association agent and the crosslinking agent.

Alternatively, the hydrogelated cellulose ether may also be prepared by performing chemical reaction between the raw materials of the water-soluble cellulose ether and at least one of the association agent and the crosslinking agent. The raw materials of the water-soluble cellulose ether may include: cellulose such as pulverized pulp; an alkalization agent such as NaOH, an etherification agent such as methyl chloride, ethylene oxide, and propylene oxide; and a reaction heat adjusting agent such as dimethyl ether. In this case, the hydrogelated cellulose ether may be prepared by adding all of the raw materials to a reactor simultaneously with at least one of the association agent and the crosslinking agent and performing chemical reaction therebetween. Alternatively, the hydrogelated cellulose ether may also be prepared by adding some of the raw materials and at least one of the association agent and the crosslinking agent to the reactor and performing chemical reaction therebetween, and then adding the other raw materials to the reactor simultaneously or sequentially and performing chemical reaction therebetween.

As described above, when mixed with water, the hydrogelated cellulose ether forms a colloidal gel instead of being dissolved in water, which is different from the water-soluble cellulose ether.

The hydrogelated cellulose ether may be formed by substituting hydrogen atoms of hydroxyl groups included in the water-soluble cellulose ether or the raw materials of the water-soluble cellulose ether with at least one type of substituent included in the association agent and the crosslinking agent.

For example, the hydrogelated cellulose ether may be formed via associative bonding of the water-soluble cellulose ether or the raw materials of the water-soluble cellulose ether by the association agent. Throughout the specification, the term "associative bonding" refers to a phenomenon in which moieties of the water-soluble cellulose ether agglomerate around moieties of the association agent when the water-soluble cellulose ether binds to the association agent in water.

As another example, the hydrogelated cellulose ether may be formed via crosslinking of the water-soluble cellulose ether or the raw materials of the water-soluble cellulose ether by the crosslinking agent.

The water-soluble cellulose ether may be selected from methylcellulose, hydroxypropylmethylcellulose, hydroxyethylmethylcellulose, carboxymethylcellulose and a mixture of at least two thereof.

The association agent may be a C10-C24 compound having a halogen group, an epoxy group, or an unsaturated group. For example, the association agent may be a C10-C24 alkyl glycidyl ether, a C10-C24 alkyl halide (for example, cetyl bromide), a halo hydride, or a mixture thereof. For example, the association agent may be a C12-C14 alkyl glycidyl ether.

The crosslinking agent may include at least two functional groups selected from a halogen group, an epoxy group, and an unsaturated group. For example, the crosslinking agent may be selected from 1,2-dichloroethane, 1,3-dichloropropane, 1,4-dichlorobutane, 2,2'-dichlorodiethylether, 1,4-butanediol diglycidyl ether, ethylene glycol diglycidyl ether, 1,6-hexanediol diglycidyl ether, propylene glycol diglycidyl ether, polyethylene glycol diglycidyl ether, polypropylene glycol diglycidyl ether, polytetramethylene glycol diglycidyl ether, neopentyl glycol diglycidyl ether, polyglycerol polyglycidyl ether, diglycerol polyglycidyl ether, glycerol polyglycidyl ether, trimethylpropane polyglycidyl ether, 1,2-(bis(2,3-epoxypropoxy)ethylene, pentaerythritol polyglycidyl ether, sorbitol polyglycidyl ether, divinyl sulfone, glycidyl methacrylate, epichlorohydrin, epibromohydrin, or a mixture of at least two thereof.

A viscosity of a 1 wt % aqueous suspension of the hydrogelated cellulose ether measured using a Brookfield viscometer at 20° C. and at 20 rpm is from 100 to 100,000 centipoises (cps) or mPa·s. Throughout the specification, the term "viscosity of (hydrogelated) cellulose ether" refers to a viscosity measured using a DV-II+Pro (spindle HA) manufactured by Brookfield Engineering and indicates a viscosity of an aqueous solution or aqueous suspension of (hydrogelated) cellulose ether having a concentration of 1 wt % at 20±0.1° C.

When the viscosity of the hydrogelated cellulose ether is within the range described above, the cement mortar for extrusion molding has an appropriate viscosity so that the cement mortar for extrusion molding may be efficiently prepared and may be efficiently extrusion-molded.

The cement mortar additive for extrusion molding may further include a surfactant.

The surfactant may include an anionic surfactant and/or a non-ionic copolymerizable surfactant.

The anionic surfactant may include at least one selected from olefin sulfonates, alkylaryl ether sulfates, polyglycol ether sulfates, alkyl phosphoric acid esters, alkyl polyethylene glycol ether phosphoric acid esters, alkyl polyethylene glycol ether carboxylic acids, fatty acid concentrations, and calcium salts.

The non-ionic copolymerizable surfactant may include at least one selected from vinyl ether alkoxylates, allyl ether alkoxylates, and allyl polyoxyalkylene sulfates.

A weight ratio of the anionic surfactant to the non-ionic copolymerizable surfactant may be 1:99 to 99:1, for example, 5:95 to 95:5, for example, 10:90 to 90:10.

A total amount of the surfactant may be from 0.001 to 20 parts by weight, for example, from 0.005 to 10 parts by weight based on 100 parts by weight of the hydrogelated cellulose ether. If the total amount of the surfactant is equal to or greater than 0.001 parts by weight based on 100 parts by weight of the hydrogelated cellulose ether, considerable effects of the addition of the surfactant such as decrease in glutinosity of the cement mortar for extrusion molding and decrease in frictional force with a die are observed. If the total amount of the surfactant is equal to or less than 20 parts by weight based on 100 parts by weight of the hydrogelated cellulose ether, the amount of the hydrogelated cellulose ether is appropriate, thereby manufacturing excellent extrusion-molded products.

The cement mortar additive for extrusion molding may further include 1 to 10 parts by weight of an antifoaming agent based on 100 parts by weight of the hydrogelated cellulose ether. Also, hydrocarbon-based or silicone-based antifoaming agents may be used.

Another embodiment of the present invention provides a cement mortar for extrusion molding including a cement and the cement mortar additive for extrusion molding.

In general, the cement may include ordinary portland cement, fast setting cement, slag cement, fly ash, alumina cement, or a mixture of at least two thereof.

Also, the cement may be used in a mixed form with dehydrate gypsum, gypsum hemihydrate, and/or anhydrous gypsum.

An amount of the cement may be adjusted within a range satisfying strength of an extrusion-molded product.

An amount of the hydrogelated cellulose ether may be from 0.1 to 7.0 parts by weight, for example, from 0.5 to 1.0 parts by weight based on 100 parts by weight of the cement mortar for extrusion molding. If the amount of the hydrogelated cellulose ether is within the range above (from 0.1 to 7.0 parts by weight), the cement mortar may be efficiently kneaded due to sufficient water retentivity and lubricity and appropriate viscosity. Since there is no need to add a large amount of water thereto for kneading, the cement mortar for extrusion molding exhibits a low degree of shrinkage after curing. The amount of the hydrogelated cellulose ether may be appropriately adjusted in accordance with composition and economic feasibility of the cement mortar for extrusion molding.

The cement mortar for extrusion molding may further include at least one of fine aggregate and fiber.

An amount of the fine aggregate may be adjusted within a range satisfying strength of extrusion-molded products.

The fine aggregate may include river sand, mountain sand, wollastonite, or a mixture of at least two thereof.

An amount of the fiber may be adjusted within a range satisfying moldability of extrusion-molded products.

The fiber may include inorganic fiber such as glass fiber, pulp such as carbon fiber, wastepaper, polyamide fiber, polypropylene fiber, polyester fiber, or a mixture of at least two thereof.

The cement mortar for extrusion molding is kneaded by a predetermined method after adding water thereto. In this regard, water is added thereto in an amount to obtain sufficient workability of the cement mortar commonly required in the art.

Another embodiment of the present invention provides an extrusion-molded product of the aforementioned cement mortar for extrusion molding.

The extrusion-molded product may be a cement panel.

Hereinafter, the present invention will be described in more detail with reference to the following examples and comparative examples. However, these examples and comparative examples are not intended to limit the purpose and scope of the present invention.

Preparation Examples 1 to 10: Preparation of Cellulose Ether

Pulverized pulp PP of wood pulp (amount of α-cellulose: 92 wt %, moisture: 4 wt %) were added to a horizontal agitated high-pressure reactor in amounts listed in Table 1 below, and the reactor content was agitated at 60 rpm for 1 minute, and then vacuum-processing and nitrogen-purging (nitrogen pressure: 2 kg/cm$^2$) of the reactor were performed twice, thereby obtaining a mixture. Then, 50 wt % of a sodium hydroxide (NaOH) aqueous solution was sprayed to the mixture at a pressure of 5 kg/cm$^2$ in amounts listed in Table 1 below in accordance with each preparation example, and the mixture was agitated for 10 minutes. Then, methyl chloride (MeCl), ethylene oxide (EO), propylene oxide (PO), dimethyl ether (DME) and epichlorohydrin (ECH) were added to the reactor in amounts listed in Table 1 below in accordance with each preparation example, and the reactor was heated to 90° C. and maintained for 30 minutes, thereby performing a reaction therein. Then, the resultant in the reactor was washed twice by dispersing in hot water at 90° C., and then dried and pulverized to obtain cellulose ether powder. Types of the resultant cellulose ether CE are shown in Table 1 below. Also, each of the prepared cellulose ethers was dispersed or dissolved in water to a concentration of 1 wt % to prepare an aqueous solution or aqueous suspension of cellulose ether, and viscosity thereof was measured. The results are shown in Table 1 below.

TABLE 1

| Preparation Example | Type of CE | PP (kg) | NaOH (kg) | MeCl (kg) | EO (kg) | PO (kg) | DME (kg) | ECH/PP (molar ratio) | Viscosity (cps) |
|---|---|---|---|---|---|---|---|---|---|
| 1 | HEMC | 5.0 | 11.2 | 8.5 | 0.84 | 0 | 5.7 | 0 | 8,120 |
| 2 | H-HEMC | 5.0 | 11.2 | 8.5 | 0.84 | 0 | 5.7 | 0.001 | 12,000 |
| 3 | H-HEMC | 5.0 | 11.2 | 8.5 | 0.84 | 0 | 5.7 | 0.002 | 15,640 |
| 4 | H-HEMC | 5.0 | 11.2 | 8.5 | 0.84 | 0 | 5.7 | 0.003 | 18,320 |
| 5 | H-HEMC | 5.0 | 11.2 | 8.5 | 0 | 0 | 5.7 | 0.004 | 19,160 |
| 6 | HPMC | 5.0 | 8.2 | 6.5 | 0 | 2.13 | 4.7 | 0 | 6,550 |
| 7 | H-HPMC | 5.0 | 8.2 | 6.5 | 0 | 2.13 | 4.7 | 0.001 | 11,680 |
| 8 | H-HPMC | 5.0 | 8.2 | 6.5 | 0 | 2.13 | 4.7 | 0.002 | 13,000 |
| 9 | H-HPMC | 5.0 | 8.2 | 6.5 | 0 | 2.13 | 4.7 | 0.003 | 10,960 |
| 10 | H-HPMC | 5.0 | 8.2 | 6.5 | 0 | 2.13 | 4.7 | 0.004 | 8,650 |

In Table 1, HEMC is hydroxyethylmethylcellulose, H-HEMC is hydrogelated hydroxyethylmethylcellulose, HPMC is hydroxypropylmethylcellulose, and H-HPMC is hydrogelated hydroxypropylmethylcellulose.

Examples 1 to 10 and Comparative Examples 1 to 4: Preparation of Cement Mortar for Extrusion Molding Cement (Asia Cement Co., Ltd., ordinary portland cement), a first sand (SAC Corporation, S-Sil20), a second sand (Kyungdong Material Co., Ltd., grade 8 sand), wollastonite (Y.N. Chemical Co., Ltd.), pulp (Arbocel ZZ8/2CA1), and polymer fiber (NYCON materials Co., Ltd., polypropylene fiber) were dry-mixed at a weight ratio of 49:30.7:10.0:5.0:5.0:0.3 to prepare a solid mixture. Then, 27 parts by weight of water and cellulose ether CE, types and amounts (based on 100 parts by weight of the solid mixture) of which are listed in Table 2 below, were added to 100 parts by weight of the solid mixture, and the mixture was kneaded using a mechanical mixer (EIRICH) to prepare a cement mortar for extrusion molding.

TABLE 2

| | CE | | |
|---|---|---|---|
| | Type | Source | Amount (parts by weight) |
| Comparative Example 1 | HPMC | Preparation Example 6 | 0.7 |
| Comparative Example 2 | HPMC | Shin-Etsu, SHV-KF | 0.7 |
| Comparative Example 3 | HEMC | Preparation Example 1 | 0.7 |
| Comparative Example 4 | — | — | 0 |
| Example 1 | H-HPMC | Preparation Example 7 | 0.7 |
| Example 2 | H-HPMC | Preparation Example 7 | 0.5 |
| Example 3 | H-HEMC | Preparation Example 2 | 0.7 |
| Example 4 | H-HEMC | Preparation Example 2 | 0.5 |
| Example 5 | H-HEMC | Preparation Example 2 | 1.0 |
| Example 6 | H-HEMC | Preparation Example 2 | 5.0 |
| Example 7 | H-HEMC | Preparation Example 2 | 7.0 |
| Example 8 | H-HPMC | Preparation Example 7 | 1.0 |
| Example 9 | H-HPMC | Preparation Example 7 | 5.0 |
| Example 10 | H-HPMC | Preparation Example 7 | 7.0 |

Evaluation Examples

Evaluation Example 1: Evaluation of Wet-Mixing Time

Water and cellulose ether were added to each of the solid mixtures in amounts according to Examples 1 to 10 and Comparative Examples 1 to 4, and the resultant mixture was kneaded using the mechanical mixer (EIRICH). A time period until the mechanical mixer stopped operation after starting kneading was measured and recorded as a wet-mixing time. The measured wet-mixing time is shown in Table 3 below.

Evaluation Example 2: Evaluation of Discharge Pressure and Extruding Rate

The cement mortars for extrusion molding prepared according to Examples 1 to 10 and Comparative Examples 1 to 4 were extrusion-molded using a vacuum extrusion molding apparatus (Dong Kwang Machinery Co., Ltd., H30-2) to manufacture extrusion-molded products. During the extrusion molding process, discharge pressures and extruding rates of the cement mortars were evaluated by the following methods, and the results are shown in Table 3 below.

(1) Evaluation of Discharge Pressure

Discharge pressure was evaluated by observing values of a manometer installed at the vacuum extrusion molding apparatus while extrusion-molding each cement mortar for extrusion molding. As the discharge pressure decreases, extrusion workability increases.

(2) Evaluation of Extruding Rate

Extruding rate of each cement mortar for extrusion molding during extrusion molding was calculated using Equation 1 below by measuring a time period until a length of an extrusion-molded product, i.e., a cement panel, discharged from a die of the vacuum extrusion molding apparatus reached 30 cm. As the extruding rate increases, productivity of the extrusion-molded product increases.

$$\text{Extruding rate} = 30 \text{ cm/time (sec)} \quad \text{Equation 1}$$

Evaluation Example 3: Evaluation of Dimensional Stability

A width and a thickness of a rectangular hole of an extrusion molding die were measured and a width and a thickness of an extrusion-molded product obtained from each cement mortar for extrusion molding were measured, a strain of the width of the extrusion-molded product to the width of the rectangular hole of the die, and a strain of the thickness of the extrusion-molded product to the thickness of the rectangular hole of the die were respectively calculated, and an average value thereof was recorded as a dimensional strain. As the dimensional strain decreases, dimensional stability increases.

TABLE 3

| | Discharge pressure (MPa) | Extruding rate (cm/sec) | Wet-mixing time (sec) | Dimensional strain (%) |
|---|---|---|---|---|
| Comparative Example 1 | 3.5 | 0.220 | 290 | 1.0 |
| Comparative Example 2 | 2.5 | 0.250 | 220 | 1.0 |
| Comparative Example 3 | 3.5 | 0.210 | 300 | 1.0 |
| Comparative Example 4 | x | x | ∞ | x |
| Example 1 | 1.7 | 0.290 | 220 | 0.5 |
| Example 2 | 1.7 | 0.295 | 225 | 0.5 |
| Example 3 | 1.5 | 0.285 | 225 | 0.5 |
| Example 4 | 1.7 | 0.295 | 225 | 0.5 |
| Example 5 | 1.5 | 0.300 | 215 | 0.5 |
| Example 6 | 1.6 | 0.295 | 215 | 0.5 |
| Example 7 | 1.6 | 0.300 | 210 | 0.5 |
| Example 8 | 1.55 | 0.295 | 220 | 0.5 |
| Example 9 | 1.6 | 0.280 | 230 | 0.5 |
| Example 10 | 1.55 | 0.280 | 235 | 0.5 |

Referring to Table 4, the cement mortars for extrusion molding prepared according to Examples 1 to 10 had lower discharge pressures and higher extruding rates than the cement mortars for extrusion molding prepared according to Comparative Examples 1 to 3. Also, extrusion-molded products prepared by extruding the cement mortars for extrusion molding prepared according to Examples 1 to 10 had better dimensional stability than the extrusion-molded products prepared by extruding the cement mortars for extrusion molding prepared according to Comparative Examples 1 to 3. Meanwhile, the cement mortar for extrusion molding prepared according to Comparative Example 4 was unable to be discharged and extrusion-molded, and the wet-mixing time and dimensional strain could not be measured.

While the present invention has been particularly shown and described with reference to exemplary embodiments thereof, it will be understood that various changes in form and details may be made therein without departing from the spirit and scope of the following claims.

The invention claimed is:

1. A cement mortar for extrusion molding comprising a cement and a cement mortar additive for extrusion molding comprising hydrogelated cellulose ether:
wherein the hydrogelated cellulose ether is formed via chemical reaction between water-soluble cellulose ether or raw materials of the water-soluble cellulose ether and at least one of an association agent and a crosslinking agent,
wherein the water-soluble cellulose ether is selected from methylcellulose, hydroxypropylmethylcellulose, hydroxyethylmethylcellulose, carboxymethylcellulose, and a mixture of at least two thereof,
wherein the association agent is a C10-C24 alkyl glycidyl ether, a C10-C24 alkyl halide, a halo hydride, or a mixture thereof,
wherein the crosslinking agent is selected from 1,2-dichloroethane, 1,3-dichloropropane, 1,4-dichlorobutane, 2,2'-dichlorodiethylether, 1,4-butanediol diglycidyl ether, ethylene glycol diglycidyl ether, 1,6-hexanediol diglycidyl ether, propylene glycol diglycidyl ether, polyethylene glycol diglycidyl ether, polypropylene glycol diglycidyl ether, polytetramethylene glycol diglycidyl ether, neopentyl glycol diglycidyl ether, polyglycerol polyglycidyl ether, diglycerol polyglycidyl ether, glycerol polyglycidyl ether, trimethylpropane polyglycidyl ether, 1,2-(bis(2,3-epoxypropoxy)ethylene, pentaerythritol polyglycidyl ether, sorbitol polyglycidyl ether, divinyl sulfone, glycidyl methacrylate, epichlorohydrin, epibromohydrin, or a mixture of at least two thereof,
wherein, when mixed with water, the hydrogelated cellulose ether forms a colloidal gel instead of being dissolved in water.

2. The cement mortar for extrusion molding of claim 1, wherein an amount of the hydrogelated cellulose ether is from 0.1 to 5.0 parts by weight based on 100 parts by weight of the cement mortar for extrusion molding.

3. The cement mortar for extrusion molding of claim 1, wherein a viscosity of a 1 wt % aqueous suspension of the hydrogelated cellulose ether measured using a Brookfield viscometer at 20° C. at 20 rpm is from 100 to 100,000 cps.

4. An extrusion-molded product of the cement mortar for extrusion molding of claim 2.

5. The extrusion-molded product of claim 4, wherein the extrusion-molded product is a cement panel.

* * * * *